No. 660,440.  
J. INGRAM.  
HOUSING FOR POULTRY.  
(Application filed July 6, 1900.)  
Patented Oct. 23, 1900.
(No Model.)
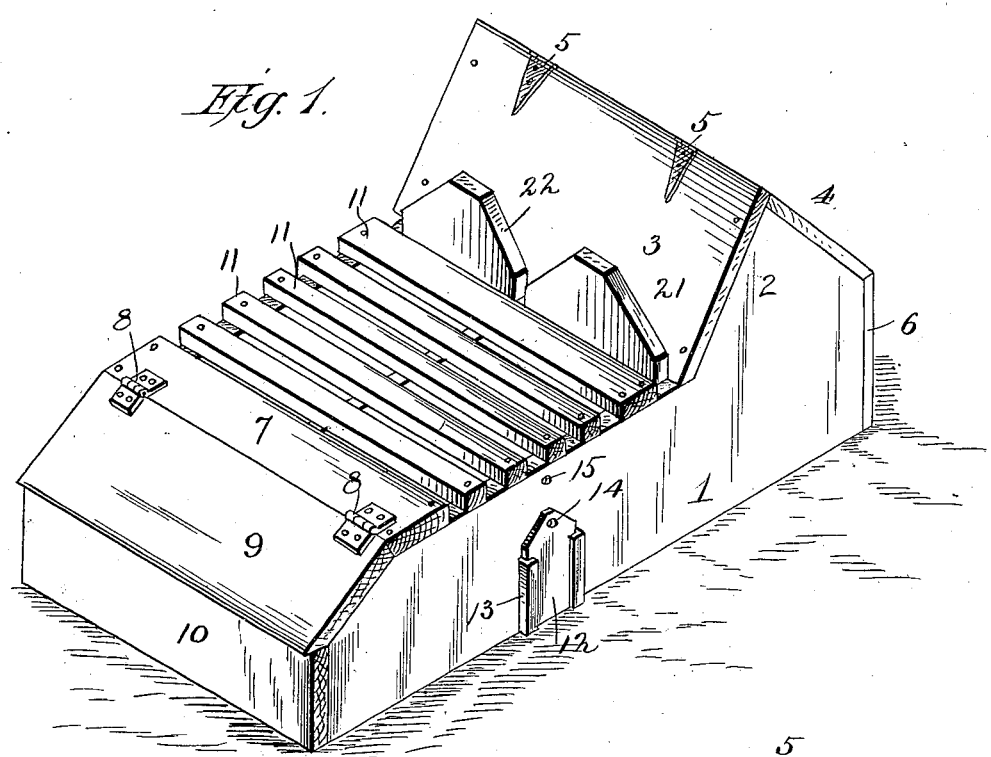
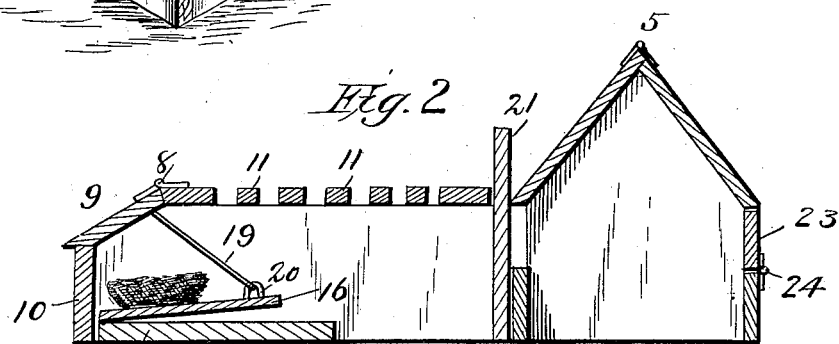
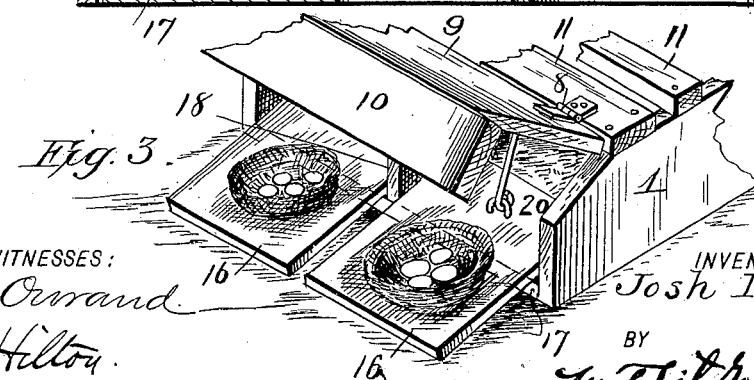
WITNESSES:  
F. L. Ourand  
Geo. Hilton
INVENTOR:  
Josh Ingram.  
BY  
W. T. Fitzgerald & Co.,  
ATTORNEYS.

UNITED STATES PATENT OFFICE.

JOSH INGRAM, OF CHAMBERSBURG, ILLINOIS.

HOUSING FOR POULTRY.

SPECIFICATION forming part of Letters Patent No. 660,440, dated October 23, 1900.

Application filed July 6, 1900. Serial No. 22,743. (No model.)

*To all whom it may concern:*

Be it known that I, JOSH INGRAM, a citizen of the United States, residing at Chambersburg, in the county of Pike and State of Illinois, have invented certain new and useful Improvements in Housings for Poultry; and I do hereby declare the following to be a full, clear, and exact description of the invention, such as will enable others skilled in the art to which it appertains to make and use the same.

My invention has relation to poultry appliances, and more particularly to a very convenient form of housing designed, primarily, for the purpose of accommodating and protecting a fowl that it may be protected during the hatching season.

One object of my invention is to provide reliably-efficient means for securing a hen or other fowl and providing all the accommodations required and at the same time sheltering her from the inclemency of the weather and guarding against interruption or intrusion.

Other objects and advantages will be made fully apparent from the following specification, considered in connection with the accompanying drawings, of which—

Figure 1 is a perspective view of my invention complete and designed for the accommodation of a single fowl. Fig. 2 is a longitudinal central section illustrating a different interior arrangement or modified construction. Fig. 3 is a perspective view showing a portion of the end of that form illustrated in Fig. 2.

In order to conveniently designate the several features of my invention and their co-operating accessories, 1 indicates the body-section of my improved housing, designed to accommodate a hen in the manner above set forth, said housing consisting of a simple box-like frame, which is preferably provided at one end with the gable extension 2, having a suitable covering 3 and 4, the latter being preferably hinged to the upper edge of the section 3, whereby the section 4 may be readily elevated and the interior inspected at will, and thus enabling the attendant to ascertain the progress that is being made in the hatching process.

It will be understood that the hinges 5, shown as being attached to the section 3, may be otherwise located, if preferred, as upon the upper edge of the section 6. In the opposite end I dispose the food for the hen, as grain of any preferred variety and water, the intermediate section between the ends being preferably slotted in order to admit sunshine and provide a light and dry walk between the nest and the food.

In order that the food may be easily placed in position, I secure the end or cross section 7, and to the outer edge thereof I connect by the hinges 8 the inclined lid-section 9, the outer free edge of which is designed to rest upon the end section 10, which may be permanently attached to the side walls 1 or may be attached to the lid-section 9, as deemed most desirable, in either event it being desirable that the edge of the section 9 shall project slightly beyond the section 10, as shown in Fig. 2. The space intermediate the section 7 and the roof-section 3 should be provided with a series of slats located a proper distance apart to permit the light to enter the interior, and thus insure that said interior will be made cheerful and healthful for the occupant.

If deemed desirable, the side section may be provided with any suitable variety of door, as the vertically-sliding section 12, properly secured in position by the cleats 13, said door-section 12 being easily secured in an elevated position by passing the pin through the aperture 14 when said aperture is brought into registration with the aperture 15, provided in the side wall 1 at a convenient point.

For all ordinary uses it is thought that the door 12 may be wholly dispensed with, inasmuch as both end sections are rendered readily accessible by means of the lid-sections 4 and 9, though I prefer to reserve the right to make the same in either way.

By the arrangement just described for protecting sitting hens they will give the attendant but little trouble while sitting, inasmuch as they are securely protected against all disturbing influences and at the same time are in a position to be conveniently fed and otherwise cared for. It is well known that it is very desirable to protect a sitting hen from intrusion, inasmuch as laying hens are prevented from having access to the nest.

Since each hen is thus left undisturbed, with plenty of food and drink, it follows that her services may be employed to hatch many more chicks than if left to her own resources, inasmuch as the chicks of the first sitting may be removed and a new sitting of eggs placed in position in the nest, it being understood that the entire nest may be easily renewed if deemed desirable. By means of the arrangement I have just described the interior of the housing may be rendered accessible, and thus enable the inside of my housing to be kept in a cleanly condition and the occupant or occupants protected from vermin, as well as other disturbing influences.

My improved housing for sitting hens may be used from year to year and will therefore prove very cheap and useful for the purpose set forth.

In order to conveniently confine the hen within that end of the housing containing the nest, the removable partitions 21 and 22 may be provided and adapted to fit in suitable grooves, thereby disposing said partitions in a vertical position ready to be easily withdrawn as desired.

It will be understood that my improved housing may be made of proper size to accommodate one hen, or a longitudinal partition may be disposed therein, thus adapting the same for the use of two hens and keeping the same wholly separated from each other, though freely accessible to the attendant.

In Fig. 2 I have illustrated a slightly-modified construction, wherein it will be seen that a floor-section 17 is provided for a portion of the smaller end of the housing, and upon said floor-section the movable nest-holding section 16 is disposed, and in order that said movable section 16 and the nest thereon may be automatically moved outward when the lid-section 9, carrying the end section 10, is raised I connect the lid-section with the movable section by means of the link or arm 19, pivotally attached to the staple or eyebolt 20. It will therefore be seen that when the lid-section 9 and the end section 10, attached thereto, are elevated the movable section 16 will be moved outward, carrying with it the nest, and thus enabling the same to be inspected. Suitable doors 23, provided with hinges 24, may be attached, if desired, to the opposite end section.

While I have described both forms of construction, I deem that form illustrated in Fig. 1 as most desirable, inasmuch as it is designed to accommodate the sitting hen and provide a home for her during the hatching season and will also afford protection and a home for the chicks when hatched, or said chicks may be removed, as above stated, and a new sitting of eggs placed in the nest.

In practice I reserve the right to wholly omit the removable section 16 and make that form of housing illustrated in Fig. 1 and fully described in the foregoing specification.

When my improved housing is provided at the front end with the movable nest-supporting sections 16, the other end or gable section may be cut off therefrom by means of the uprights 21 and 22, when said gable-section may be used for housing small chicks or provided with nests for laying hens, it being understood that the door 23 may be left open or closed, as desired.

Believing that the advantages and use of my improved poultry appliance have been made fully apparent from the foregoing specification, considered in connection with the accompanying drawings, further reference to the details is deemed unnecessary.

Having thus fully described my invention, what I claim as new, and desire to secure by Letters Patent, is—

1. The herein-described poultry-housing comprising a gable-section 2 and an end section, in combination with movable nest-sections 16 and suitable means to connect said sections with the door whereby said sections will be moved outward when the door is opened and withdrawn when the door is closed, all combined as specified and for the purpose set forth.

2. In a poultry-housing a movable nest-supporting section, a door, and suitable means to connect the door with said movable section whereby said section will be moved outward when the door is opened and will be withdrawn within the housing when the door is closed all substantially as specified and for the purpose set forth.

3. A poultry-housing comprising a gable-section having a roof and an end section provided with a slatted cover and a suitable door in the end thereof, in combination with movable nest-sections 16 and a controlling-rod 19 operatively connecting said door with said nest-section whereby said section will be moved outward when the door is opened and will be withdrawn within the housing when said door is closed all operatively combined substantially as specified and for the purpose set forth.

In testimony whereof I affix my signature in presence of two witnesses.

JOSH INGRAM.

Witnesses:
 FRITZ INGRAM,
 JOHN BYRNS.